(12) United States Patent
Weinmeister et al.

(10) Patent No.: US 11,056,940 B2
(45) Date of Patent: Jul. 6, 2021

(54) ASSEMBLED ROTOR SHAFT WITH AN ASYMMETRICAL DESIGN, ROTOR, AND METHOD FOR PRODUCING THE ASSEMBLED ROTOR SHAFT AND ROTOR

(71) Applicants: THYSSENKRUPP PRESTA TECCENTER AG, Eschen (LI); thyssenkrupp AG, Essen (DE)

(72) Inventors: Roman Weinmeister, Buchs (CH); Martial Danthois, Balzers (LI)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 228 days.

(21) Appl. No.: 16/327,414

(22) PCT Filed: Aug. 21, 2017

(86) PCT No.: PCT/EP2017/071018
§ 371 (c)(1),
(2) Date: Feb. 22, 2019

(87) PCT Pub. No.: WO2018/036956
PCT Pub. Date: Mar. 1, 2018

(65) Prior Publication Data
US 2019/0199152 A1    Jun. 27, 2019

(30) Foreign Application Priority Data
Aug. 25, 2016 (DE) .................... 10 2016 215 979.8

(51) Int. Cl.
*H02K 1/28* (2006.01)
*H02K 7/00* (2006.01)

(52) U.S. Cl.
CPC ............. *H02K 1/28* (2013.01); *H02K 7/003* (2013.01)

(58) Field of Classification Search
CPC ................................. H02K 1/28; H02K 7/003
See application file for complete search history.

(56) References Cited

U.S. PATENT DOCUMENTS 7,037,072 B2 * 5/2006 Carson ..................... F03B 1/00
416/1
2012/0104884 A1    5/2012 Wagner

FOREIGN PATENT DOCUMENTS

| CH | 27 587 A | 1/1904 |
| CN | 1366728 A | 8/2002 |

(Continued)

OTHER PUBLICATIONS

English Translation of International Search Report issued in PCT/EP2017/071018, dated Oct. 26, 2017.

*Primary Examiner* — Carl J Arbes
(74) *Attorney, Agent, or Firm* — thyssenkrupp North America, LLC (57) ABSTRACT

An assembled rotor shaft of asymmetrical design may comprise two rotor shaft components, a first rotor shaft component configured as a shaft segment with a tube section and a flange section, and a second rotor shaft component configured as a flange element. The tube section may include a tube outer surface with a profiling. A rotor of an electric machine, which includes the assembled rotor shaft, may further include a laminated core and a pressure disk disposed in the tube section. The laminated core can include laminated core disks, each of which has a structuring that corresponds to the profiling of the rotor shaft. The profiling and the structuring of the laminated core disks may form a positively locking connection.

18 Claims, 5 Drawing Sheets

(56) References Cited

FOREIGN PATENT DOCUMENTS

| | | | |
|---|---|---|---|
| CN | 201639381 U | | 11/2010 |
| CN | 102195377 A | | 9/2011 |
| CN | 102244425 A | | 11/2011 |
| CN | 202906609 U | | 4/2013 |
| CN | 104054241 A | | 9/2014 |
| DE | 42 40 045 C | | 2/1994 |
| DE | 101 48 669 A | | 4/2003 |
| DE | 10 2006 047 186 A | | 4/2008 |
| DE | 10 2010 040 008 A | | 3/2012 |
| DE | 10 2011 012 429 A | | 8/2012 |
| DE | 10 2011 054 955 A | | 5/2013 |
| EP | 0 855 781 A | | 7/1998 |
| JP | 63-112731 A | * | 5/1988 |
| WO | 2015/172986 A | | 11/2015 |

* cited by examiner

ASSEMBLED ROTOR SHAFT WITH AN ASYMMETRICAL DESIGN, ROTOR, AND METHOD FOR PRODUCING THE ASSEMBLED ROTOR SHAFT AND ROTOR

CROSS REFERENCE TO RELATED APPLICATIONS

This application is a U.S. National Stage Entry of International Patent Application Serial Number PCT/EP2017/071018, filed Aug. 21, 2017, which claims priority to German Patent Application No. DE 10 2016 215 979.8, filed Aug. 25, 2016, the entire contents of both of which are incorporated herein by reference.

FIELD

The present disclosure generally relates to electric machines, including assembled rotor shafts having an asymmetrical design.

BACKGROUND

During the production of electric machines, in particular for electrically drivable vehicles, it is fundamentally known to reduce their weight and at the same time to increase their performance, in order to advantageously make an increase of the range of the vehicles possible. Accordingly, the aim is to also reduce the weight of the rotor shafts of the electric machines. To this end, DE 10 2011 012 429 A1 describes a three-piece rotor shaft having two side covers and a main body which is arranged between said side covers, the side covers and the main body being connected to one another by way of a press-fit connection. The main body is configured as a hollow body, the laminated cores being attached around the hollow cylinder. The laminated cores are fixed on the main body by way of an oversize connection, with the result that it is necessary that the main body has to have a defined rigidity, in order not to deform during the arranging of the laminated cores and at the same time to make a sufficient non-positive connection between the laminated cores and the assembled rotor shaft possible for the operation of the electric machine. Strong materials which have, in particular, a defined rigidity also have a high weight and/or a high price in a known way.

DE 42 40 045 C1 which likewise discloses a three-piece rotor shaft describes a comparable subject matter. The rotor shaft is made from a tubular connecting piece, to which in each case one end piece with a bearing point for the bearings is fastened on the A-side and on the B-side in an integrally joined manner by way of rotary friction welding. In order to produce the rotor shaft, it is necessary to connect three components which can be produced separately from one another to one another in such a way that a torque can be transmitted from the laminated core via the rotor shaft to the component to be driven reliably even during full load operation. In particular, a pressed joint between the laminated core and the rotor shaft can have the disadvantage that a release of the connection and therefore slip can occur during the torque transmission between the laminated core and the rotor shaft.

Thus a need exists for an assembled rotor shaft, a rotor and a method for producing the assembled rotor shaft and for producing a rotor, which make a production of an assembled rotor shaft and a rotor having an assembled rotor shaft possible in a simple, inexpensive way, at least the assembled rotor shaft, Consequently, the rotor should have reduced weights, and a permanently reliable torque transmission between the laminated core of the rotor and the rotor shaft.

BRIEF DESCRIPTION OF THE FIGURES

FIG. 3b is a side view of the example shaft segment shown in FIG. 3a.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to assembled rotor shafts having an asymmetrical design, as well as to rotors that include such assembled rotor shafts. Furthermore, the present disclosure also generally relates to methods for producing an assembled rotor shaft and an assembled rotor.

The features and details which are described in conjunction with the assembled rotor shaft and/or the rotor also apply here in conjunction with the method for producing an assembled rotor shaft and/or the method for producing a rotor, and in each case vice versa, with the result that reference is always made or can always be made mutually with regard to the disclosure in respect of the individual aspects of the disclosure. Moreover, the assembled rotor shaft can be produced by way of the method for producing an assembled rotor shaft, and the rotor can be produced by way of the method for producing a rotor.

The assembled rotor shaft according to the invention of asymmetrical design comprises exclusively two rotor shaft components. Here, the first rotor shaft component is a shaft segment, having a tube section and a flange section, whereas the second rotor shaft component is a flange element. According to the invention, the tube section of the first rotor shaft component, in particular of the shaft segment, has a tube outer surface with a profiling. Within the context of the invention, the asymmetrical design of the assembled rotor shaft is understood to mean a design, in the case of which there is no mirror plane for mirroring the assembled rotor shaft relative to the rotational axis, in particular orthogonally with respect to the rotational axis. This means that the assembled rotor shaft, in particular the first rotor shaft component, is of geometrically different configuration than the second rotor shaft component. Whereas the first rotor shaft component is a shaft segment which has a tube section and a flange section, the second rotor shaft component comprises, according to the invention, merely a flange element which can be connected to the tube section of the shaft segment in order to form the assembled rotor shaft.

The configuration of said two-piece assembled rotor shaft advantageously makes the use of different materials possible, which are suitable firstly to ensure the individual functionalities of the first rotor shaft component and the second rotor shaft component and secondly at the same time to minimize the costs during the production of the assembled rotor shaft. It is thus conceivable that the first rotor shaft component, in particular the shaft segment, has a material which is less strong with respect to the second rotor shaft component and is therefore less expensive to produce. To this end, the shaft segment or the first rotor shaft component advantageously serves to arrange a laminated core on the tube section. In accordance with the present invention, it is advantageously conceivable that the laminated core is not pressed on the tube section (as known from the cited prior art), but rather is connected in a positively locking manner to the tube section of the shaft segment, at least as viewed in the circumferential direction of the tube section, in order to ensure a sufficient torque transmission between the laminated core and the shaft segment of the assembled rotor shaft.

In contrast, it is possible that the second rotor shaft component, in particular the flange element, consists of a stronger material in comparison with the shaft segment. This advantageously serves to make it possible for a thread, in particular an internal thread, to be cut, for example, in the flange element, in order to make a connection possible, for example, to a component to be driven, such as a shaft or axle. It is likewise conceivable that a toothing system, in particular a spline system or a splined joint, is configured in the flange element, via which toothing system the torque is transmitted to a component to be driven. The lightweight construction potential of an assembled rotor shaft is advantageously exploited sufficiently by way of the two-piece assembled rotor shaft of asymmetrical design. A reduction of the tube diameter which has a negative effect, for example, on the transmission capability of the torque between the laminated core and the shaft segment is advantageously avoided by means of the assembled rotor shaft according to the invention. Furthermore, merely one single joint or connection between the individual rotor shaft components is advantageously required in the case of the assembled rotor shaft according to the invention.

Within the context of the invention, it is conceivable, furthermore, that the profiling is at least one material cutout or flattened material portion which extends at least in sections in the longitudinal direction of the first rotor shaft component. The profiling advantageously extends completely along the tube outer surface of the tube section in the longitudinal direction of the first rotor shaft component, in particular of the shaft segment. The profiling, as explained in more detail hereinafter, advantageously serves to interact with a structuring of a laminated core disk, in order to make a positively locking connection possible between at least one of the laminated core disks of a laminated core and the rotor shaft. Within the context of the invention, the longitudinal direction is to be understood to mean the axial direction along the rotational axis of the assembled rotor shaft or the rotor.

Furthermore, it is conceivable that the profiling consists of a plurality of material cutouts or flattened material portions which are configured such that they are distributed in the circumferential direction. The plurality of material cutouts or flattened material portions are advantageously configured such that they are distributed uniformly with respect to one another in the circumferential direction of the tube section on its tube outer surface. It is also conceivable, however, that the plurality of material cutouts or flattened material portions are configured such that they are distributed non-uniformly in the circumferential direction of the tube section on its tube outer surface.

Furthermore, it is conceivable that each of the plurality of material cutouts or flattened material portions extend at least in sections in a manner which is spaced apart uniformly from one another in the axial direction of the first rotor shaft component, in particular the shaft segment. It is advantageously also conceivable that each of the plurality of material cutouts or flattened material portions extend completely along the tube outer surface of the tube section of the shaft segment or of the first rotor shaft component.

It is possible that the at least one material cutout or each of the plurality of material cutouts is configured in the form of a depression, in particular in the form of a groove.

In the case of the configuration of a material cutout or a flattened material portion as a profiling, the profiling can advantageously be produced in a simple and inexpensive way on the tube outer surface of the tube section of the shaft segment. It is thus possible that the profiling of corresponding configuration is already made in the tube outer surface during the manufacturing step of the production of the shaft segment (in the case of a material cutout), or the tube outer surface is configured or shaped correspondingly taking the flattened material portion into consideration.

Furthermore, it is possible that at least the flange section or the flange element is configured as a medium-permeable or medium-impermeable flange. It is thus possible that, for example, a liquid or gaseous cooling medium for cooling the assembled rotor shaft, advantageously also the entire rotor which has the assembled rotor shaft, is introduced into the assembled rotor shaft, in particular into the tube section of the assembled rotor shaft. It is possible here that the cooling medium is introduced for cooling purposes through the medium-permeable flange section or the medium-permeable flange element into the first rotor shaft component or shaft segment, in particular the tube section of the shaft segment, whereas the medium-impermeable flange section or the medium-impermeable flange element prevents an escape from the tube section of the shaft segment. It is conceivable here that, furthermore, the cooling medium is forwarded, starting from the tube section, to a laminated core which is torque-connected to the tube section, for example. To this end, for example, the tube section has different openings for the passage of the cooling medium to the laminated core. It is also conceivable that the medium-permeable flange section or the medium-permeable flange element has an inlet duct and an outlet duct, the cooling medium being introduced via the inlet duct into the tube section of the shaft segment and being transported out of the tube section of the shaft segment via the outlet duct. It is possible here that, for example, a sleeve is configured in the tube section, in a manner which, advantageously starting from the medium-permeable flange section or the medium-permeable flange element, extends at least in sections as far as into the tube section of the shaft segment. The flowable cooling medium can advantageously be introduced, for example, through the inner cross section of the sleeve into the tube section, and the cooling medium which is loaded with thermal energy can be transported out of the tube section via a duct, configured by the outer circumferential surface of the tube and the bore of the flange element or the flange section. It is also conceivable that the flange section and the flange element are configured in each case as medium-permeable components, with the result that the cooling medium is introduced into the tube section of the shaft segment either through the flange section or the flange element and, as a consequence, is transported out of the tube section again on the opposite side, namely through the flange element which is arranged there or the flange section which is configured there.

Furthermore, it is conceivable that the first rotor shaft component has a collar which extends to the outside in the circumferential direction at one distal end of the tube section, which distal end lies opposite a distal end, on which the flange section is configured. The collar advantageously serves as a positioning element or else as holding elements for positioning and/or holding a laminated core or a laminated core disk or else a pressure disk at least in an axial direction. The collar is advantageously configured in one piece with the shaft segment or in one piece with the tube section of the shaft segment.

Furthermore, a rotor of an electric machine, such as a synchronous machine or an asynchronous machine, is claimed, the rotor having an assembled rotor shaft in accordance with the preceding type and at least one laminated core which is arranged on the tube section and at least one pressure disk which is arranged on the tube section. The laminated core advantageously makes contact with the collar of the tube section of the shaft segment, the pressure disk being arranged on the tube section in such a way that the laminated core is arranged fixedly in terms of displacement in the axial direction between the pressure disk and the collar of the tube section of the shaft segment. The pressure disk and the collar of the tube section of the shaft segment advantageously press the laminated core or the laminated core disks of the laminated core onto one another axially. Furthermore, it is conceivable that two pressure disks are arranged on the tube section, between which the laminated core is clamped, as viewed in the axial direction. The two pressure disks advantageously press the laminated core or the individual laminated core disks of the laminated core together in the axial direction. Accordingly, it is conceivable, furthermore, that, in the case of an arrangement of two pressure disks which are arranged on the section, at least one of the pressure disks bears against the collar or is supported on the collar as viewed in the axial direction.

Furthermore, it is possible that the laminated core has a plurality of laminated core disks, each of the laminated core disks having a structuring which corresponds to the profiling of the rotor shaft, the profiling of the rotor shaft and the structuring of the laminated core disks forming a positively locking connection. Here, the structuring is advantageously to be considered to be a geometric negative of the profiling. It is conceivable that the structuring is configured, for example, in a geometric design of a projection, a material elevation or a lug, or in a comparable design. It is also conceivable that the structuring is configured in a geometric design of a flattened portion on the surface of the bore of the laminated core disks, in particular the disk inner surface. It is to be noted here that the laminated core disks have a central bore, in order to guide through the tube section, in order, as a consequence, to make an arrangement of the laminated core disks on the tube section possible. In the case of a configuration of the profiling as a material cutout, in particular a depression or a groove, and in the case of a configuration of the structuring as a projection, it is possible that the structuring engages into the profiling. It is advantageously possible that, on account of the configuration of the profiling of the rotor shaft and of the structuring of the individual laminated core disks, a torque transmission is made possible between the laminated core or the laminated core disks of the laminated core and the assembled rotor shaft, in particular the shaft segment of the assembled rotor shaft, without losses in comparison with a non-positive connection between the laminated core and the shaft.

Furthermore, it is conceivable that a roll-formed portion is additionally configured on the tube outer surface at least in a setting region of the at least one pressure disk, in such a way that at least a non-positive connection between the pressure disk and the tube section is produced. It is likewise possible that a non-positive and positively locking connection is produced by means of the roll-formed portion. It is conceivable that, in the case of an arrangement of more than one pressure disk, in particular of two pressure disks, two roll-formed portions are also configured on the tube section. It is thus possible that, in addition or as an alternative to the configuration of the collar of the assembled rotor shaft, a second roll-formed portion is produced on the tube section so as to axially adjoin the collar.

In the case of the rotor which is described, all the advantages result which have already been described in respect of an assembled rotor shaft in accordance with the first aspect of the invention.

Furthermore, a method for producing an assembled rotor shaft in accordance with the preceding type is claimed, the method having at least the following steps:

forming, in particular tensile compressive forming of a tube for producing the first rotor shaft component, having the tube section, the flange section and the profiling, providing of a flange element as a second rotor shaft component, and connecting of the first rotor shaft component to the second rotor shaft component at least by means of a positively locking, non-positive or integrally joined connection.

In accordance with the present method, it is advantageously possible to produce the first rotor shaft component during only a single manufacturing step. Here, the profiling is already produced during the configuration of the tube section and the flange section. It is advantageously conceivable that the collar is also configured during the production of the first rotor shaft component, during the forming or the tensile compressive forming process. It is also conceivable that the collar is produced in a subsequent method step, in particular during a hot forming process or during a hot forming method step, in particular is configured on the tube section of the shaft segment. It is also conceivable that the flange element which is provided as a second rotor shaft component for the method has a collar instead of the first rotor shaft component. It is thus possible that the flange element is manufactured in a comparable manner to the first rotor shaft component, in particular to the shaft segment, by means of a forming method, in particular a tensile compressive forming method, including or excluding the collar, before it is fed to said method for producing an assembled rotor shaft.

It is also conceivable that the shaft segment, in particular the tube section, has a shoulder which extends at least in sections in the axial direction, runs in the circumferential direction of the tube section, and is configured at one distal end of the tube section, which distal end lies opposite the distal end, at which the collar is configured on the tube section. It is advantageously conceivable that a roll-formed portion is configured on the surface of the shoulder, on which roll-formed portion, for example, a pressure disk can be arranged at least in a non-positive manner, advantageously in a non-positive and positively locking manner. The configuration of a shoulder on the tube section advantageously serves to make it possible that the roll-formed portion can already be produced before the arrangement of the first pressure disk or the first and the second pressure disk and the laminated core on the tube section of the shaft segment, it being possible for at least some of the components to be pushed over the already existing roll-formed portion without producing a non-positive connection with the latter. It is advantageous here if, in particular, the pressure disk which is to produce a non-positive connection with the roll-formed portion which is configured on the shoulder has a bore diameter which is of smaller configuration in comparison with the bore diameter, for example, of a first pressure disk and/or a laminated core.

In the case of the arrangement of the first rotor shaft component, in particular the shaft segment with the second rotor shaft component, in particular the flange element, it is possible to connect said components by means of a positively locking connection. It is conceivable here that a threaded connection is produced between the flange element and the tube section of the shaft segment. It is possible here that, for example, the tube section has an internal thread at least at one distal end, whereas the flange element has an external thread which engages into the internal thread. It is also conceivable that the total tube section, in particular the surface of the bore of the tube section, has an internal thread. Furthermore, it is possible that the shaft segment and the flange element are pressed to one another. It is possible here that a material accumulation, such as a roll-formed portion, is produced, in particular, on the inner side of the tube section, it also being conceivable that a material accumulation or roll-formed portion of this type is also produced, in particular, on the external diameter of the flange element, in particular in the joining section of the latter, in order to make a secure non-positive connection possible between the first rotor shaft component and the second rotor shaft component. Furthermore, it is conceivable that the first rotor shaft component is connected to the second rotor shaft component by means of an integrally joined connection, in particular a welded connection.

In the case of the method which is described, all the advantages result which have already been described in respect of an assembled rotor shaft in accordance with the first aspect of the invention and a rotor in accordance with the second aspect of the invention.

Furthermore, a method for producing a rotor in accordance with the preceding type is claimed. The method has at least the following steps:

a) providing of an assembled rotor shaft in accordance with the preceding type, b) pushing of a laminated core onto the tube section in such a way that the structuring of the laminated core disks of the laminated core interact in a positively locking manner with the profiling of the tube section, the laminated core being pushed on as far as a collar which is configured on the tube section or as far as a first pressure disk which is arranged on the tube section, and c) pushing of a pressure disk, in particular a second pressure disk, which braces the laminated core axially onto the tube section as far as a roll-formed portion which is configured on the tube outer surface of the tube section in the setting region of the pressure disk, in such a way that the laminated core disks are pressed together axially.

Depending on the configuration of the profiling and the structuring, it is conceivable that the structuring also engages at least partially into the profiling.

It is conceivable within the context of the invention that, temporally before step a), a first pressure disk is pushed onto the tube section at least as far as a first roll-formed portion which is configured on the tube outer surface of the tube section or as far as a collar which is configured on the tube section.

Furthermore, it is conceivable that the method for producing a rotor also comprises the steps of the method for producing an assembled rotor shaft, as mentioned previously, in order to produce an assembled rotor shaft of the abovementioned type and to provide the assembly method for producing a rotor.

In the case of the method which is described, all the advantages result which have already been described in respect of an assembled rotor shaft in accordance with the first aspect of the invention, a rotor in accordance with the second aspect of the invention, and a method for producing an assembled rotor shaft in accordance with the third aspect of the invention.

Figure 1A:
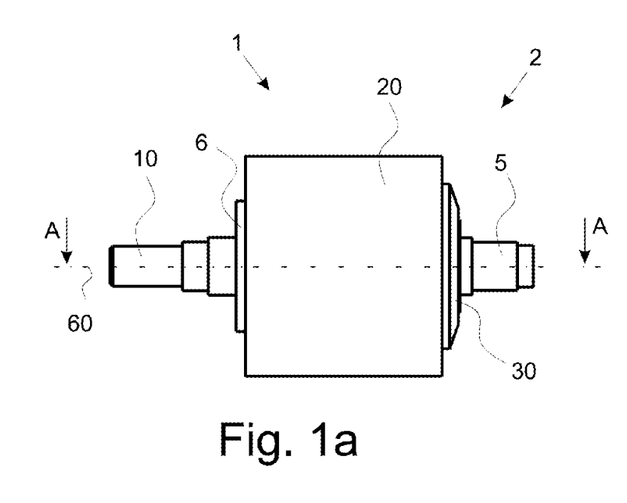
FIG. 1a is a side view of an example rotor.
Figure 1B:
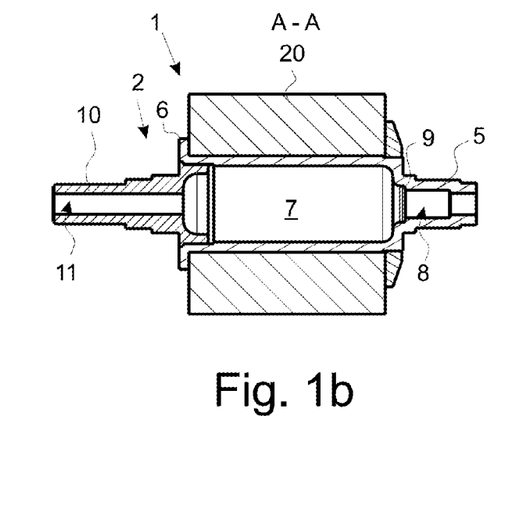
FIG. 1b is a side view of section A-A in FIG. 1 of the example rotor.
Figure 1C:
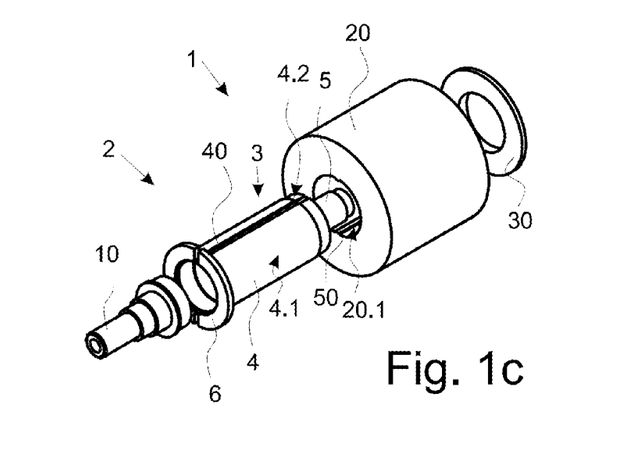
FIG. 1c is an exploded perspective view of the example rotor shown in FIGS. 1a and 1b.

FIGS. 1a to 1c show one embodiment of a rotor 1 according to the invention in various illustrations. The rotor 1 has a rotor shaft 2 which comprises a first rotor shaft component 2.1 and a second rotor shaft component 2.2. According to the invention, the first rotor shaft component 2.1 is a shaft segment 3 which has a tube section 4 and a flange section 5. According to the invention, the second rotor shaft component 2.2 has a flange element 10. The shaft segment 3 advantageously has a cavity 7, within which, for example, a flowable cooling medium, in particular a gaseous or liquid cooling medium, can be introduced. In accordance with that embodiment of the rotor 1 according to the invention which is shown in FIGS. 1a to 1c, the shaft segment 3 additionally has a collar 6 which extends radially to the outside at one distal end of the tube section 4 of the shaft segment 3. The collar 6 is advantageously configured at that distal end of the shaft segment 3, in particular of the tube section 4, which lies opposite the distal end, at which the flange section 5 of the shaft segment 3 is configured. The flange section 5 and the tube section 4 of the shaft segment 3 are configured in one piece or configure a single-piece shaft segment 3, and are advantageously produced from a tube in one method step. The flange element 10 which is the second rotor shaft component 2.2 of the rotor shaft 2 advantageously has a bore 11. The bore 11 advantageously extends in the axial direction along the rotational axis 60 and is advantageously configured in the form of a through bore.

The bore 11 advantageously serves for the inlet and/or for the outlet of a flowable cooling medium. In a comparable manner to this, it is possible that the flange section 5 of the shaft segment 3 and, as a consequence, of the first rotor shaft component 2.1 also has a bore 8 which extends in the axial direction at least in sections along the rotational axis 60. In addition, it is conceivable that a closure element 9, for example in the form of a plug, closes the bore 8 of the flange section 5 in such a way that, for example, a cooling medium which is introduced into the cavity 7 of the tube section 4 cannot flow out of the tube section 4 through the flange section 5. It would also be conceivable, however, that a closure element 9 of this type is not arranged or configured in the bore 8 of the flange section 5 of the shaft segment 3, with the result that the flange section 5 is also a medium-permeable element.

In the case of a medium-permeable element, in particular a medium-permeable flange section 5 or flange element 10, it is advantageously conceivable that a flowable cooling medium is conveyed at least into the cavity 7 of the tube section 4 of the shaft segment 3 and/or is moved out of said cavity 7 counter to the inflow direction. It is also conceivable that the flange element 10 and the flange section 5 are in each case medium-permeable elements, with the result that the cooling medium is introduced, for example, through one of the elements into the cavity 7 of the tube section 4 of the shaft segment 3, and is conveyed out of said cavity 7 again through the other medium-permeable element.

It is advantageously conceivable that the flange element 10 has a joining section 10.1 which enters into a connection, in particular, with a section of the shaft segment 3 advantageously at one distal end of the tube section 4 in order to connect the shaft segment 3 to the flange element 10. It is conceivable here that an external thread (not shown) is configured on the section 10.1, in particular on its outer surface, which external thread engages, for example, into an internal thread (not shown here) which is configured on the inner surface of the tube section 4.

In addition to the rotor shaft 2, the rotor 1 in accordance with FIGS. 1a to 1d has a laminated core 20 having a plurality of laminated core disks (not shown in detail here). The laminated core 20, in particular the individual laminated core disks (not shown here) of the laminated core 20, has/have a bore 20.1 which serves to receive the rotor shaft 2, in particular the tube section 4 of the shaft segment 3, in such a way that the laminated core 20 is arranged on the rotor shaft 2.

The rotor shaft 2, in particular the tube section 4 of the shaft segment 3 and, as a consequence, the first rotor shaft component 2.1, has a profiling 40. The profiling 40 is advantageously configured at least on the tube section 4 of the shaft segment 3, it also being conceivable that the profiling 40 also comprises the collar 6 and/or the flange section 5 of the shaft segment 3 at least in sections. The profiling 40 is advantageously configured on the tube outer surface 4.1 of the tube section 4. The profiling 40 is particularly advantageously configured as at least one flattened material portion which extends in the axial direction along the rotational axis 60, particularly advantageously as a material depression. Within the context of the invention, a flattened material portion is understood to mean, in particular, a section on the tube section 4 of the shaft segment 3, which section has a different geometry with regard to the outer circumference. The region of the flattened material portion advantageously has a smaller radius than the remaining wall regions of the tube section 4 of the shaft segment 3. This means that, in the region of the flattened material portion, the tube section 4, in particular the tube outer surface 4.1, does not have a circular form, but rather has a straight form which extends in the circumferential direction.

Furthermore, it is possible that the rotor 1 according to the invention in accordance with FIGS. 1a to 1c has a pressure disk 30. In a corresponding manner to the laminated core 20, said pressure disk 30 is pushed onto the tube section 4 of the shaft segment 3 and advantageously serves to press the individual laminated core disks of the laminated core 20 against one another in the axial direction. The collar 6 which is configured on the tube section 4 of the shaft segment 3 advantageously serves as a stop element on a side which lies opposite the pressure disk 30. Accordingly, merely one pressure disk 30 is required during the assembly of the rotor 1 which is shown here. In order to advantageously establish a positively locking connection between the rotor shaft 2 and the laminated core 20, by way of which positively locking connection a torque transmission is made possible between the laminated core 20 and the rotor shaft 2, the laminated core 20, in particular the individual laminated core disks, has/have a structuring 50. The structuring 50 is advantageously configured on the surface of the bore or through opening 20.1 and, when the laminated core 20 or the individual laminated core disks is/are pushed onto the tube section 4 of the shaft segment 3, interacts with the profiling 40 which is configured on the tube section 4 or on the tube outer surface 4.1. It is thus conceivable that the structuring 50 is also configured in the geometric form of a flattened material portion which, as a consequence, advantageously forms the geometric negative to the profiling 40. It is additionally conceivable that, if the profiling 40 is configured as a material recess, in particular a depression or a groove, the structuring 50 is configured in the geometric form of a projection, in particular a lug, which engages into the groove of the tube section 4. The geometric configuration of the profiling 40 and, as a consequence, of the structuring 50 is not to be restricted by way of an embodiment which is shown here. It is advantageously conceivable that any geometric designs can be used to configure the profiling 40 and the structuring 50 which serve to ensure that a sufficient positively locking connection is produced between the laminated core 20 or the individual laminated core disks of the laminated core 20 and the rotor shaft 2, with the result that a non-lessening torque transmission advantageously takes place between the laminated core 20 and the rotor shaft 2.

For the arrangement of the pressure disk 30, it is advantageously conceivable that a roll-formed portion (not shown here) is applied on the tube section 4. The roll-formed portion (not shown here) is advantageously configured at one distal end of the tube section 4 on the tube outer surface 4.1, which lies opposite that distal end of the tube section 4, at which the collar 6 is configured. In the case of an arrangement of the pressure disk 30 on the roll-formed portion of the tube section 4, a non-positive connection advantageously takes place between the pressure disk 30 and the roll-formed portion, with the result that the pressure disk 30 is connected fixedly to the tube section 4 of the shaft segment 3 and, as a consequence, the rotor shaft 2 so as to rotate with them.

It is advantageously conceivable that the tube section 4 of the shaft segment 3 has a shoulder 4.2. The shoulder 4.2 is advantageously formed at one distal end of the tube section 4 which lies opposite that distal end of the tube section 4, at which the collar 6 is configured. The shoulder 4.2 of the tube section 4 advantageously has a smaller outer circumference than the remaining part of the tube section 4 and, as a consequence, is offset radially to the inside. The shoulder 4.2 advantageously extends at least in sections in the axial direction. It is conceivable that a roll-formed portion is configured in the region of the shoulder 4.2 on the tube outer surface 4.1 of the tube section 4 of the shaft segment 3. This advantageously serves to ensure that the roll-formed portion can already be configured on the tube section 4 before the attachment of the laminated core 20 and the pressure disk 30, without the laminated core 20 being undesirably connected in a non-positive manner to the roll-formed portion when said laminated core 20 is being pushed on. To this end, the pressure disk 30 advantageously has a through bore 30.1 of smaller dimensions than the laminated core 20 or the individual laminated core disks of the laminated core 20, with the result that a non-positive connection is made possible between the pressure disk 30 and the roll-formed portion which is produced on the shoulder 4.2. The diameter of the through bore 30.1 of the pressure disk 30 is advantageously smaller than the external diameter of the roll-formed portion which is configured on the shoulder 4.2. Accordingly, the bore 20.1 of the laminated core 20 or of the individual laminated core disks of the laminated core 20 is of larger configuration than the external diameter of the roll-formed portion which is configured on the shoulder 4.2.

Figure 1D:
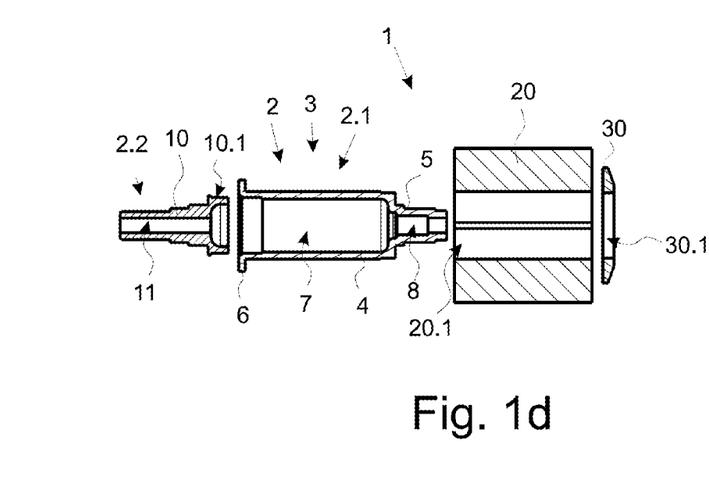
FIG. 1d is a side view of a section of the exploded view shown in FIG. 1c.

FIGS. 1c and 1d additionally also illustrate one embodiment of a method for producing an assembled rotor shaft 2 and a rotor 1. Here, a first rotor shaft component 2.1, in particular a shaft segment 3, is first of all produced from a tube, which first rotor shaft component 2.1 has the tube section 2, the flange section 5 and the profiling 40. A collar 6 is advantageously formed on the tube section 4. The shaft segment 3 is connected to the second rotor shaft component 2.2, in particular the flange element 10, in a positively locking, non-positive and/or integrally joined manner. A laminated core 20 is advantageously subsequently pushed onto the assembled rotor shaft 2. The pushing on advantageously takes place via the side or that distal end of the shaft segment, on/at which the flange section 5 is configured. The laminated core 20 has a plurality of laminated core disks (not shown here) having a structuring 50. The laminated core 20 is pushed onto the assembled rotor shaft 2 in such a way that the structuring 50 passes into engagement with the profiling 20. Finally, the pressure disk 30 is pushed onto the tube section 4, which pressure disk 30 is advantageously connected in a non-positive manner to a roll-formed portion (not shown here) which is applied on the tube section 4 in the setting region of the pressure disk 30. For this purpose, said roll-formed portion can be produced before or after the application of the laminated core 20 and/or before the arrangement of the pressure disk 30.

Figure 2:
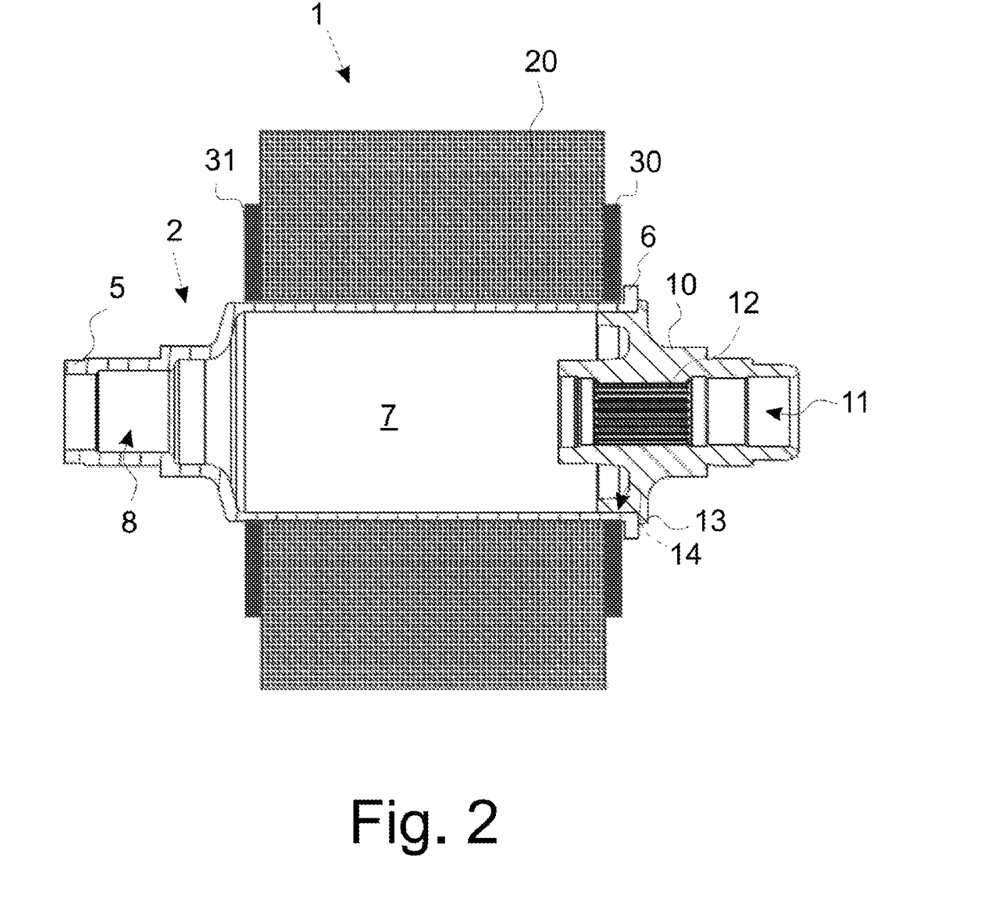
FIG. 2 is a side sectional view of another example rotor.

FIG. 2 shows a side sectional illustration of a further embodiment of a rotor 1 according to the invention. The rotor which is shown in FIG. 2 corresponds substantially to that embodiment of a rotor 1 according to the invention which is shown in FIGS. 1a to 1d, and differs, in particular, by way of an arrangement of a first pressure disk 30 and a second pressure disk 31, and by way of a thread 12 which is made in the flange element 10. The thread 12 is advantageously configured in the form of an internal thread and extends at least in sections along the bore 11 which is configured in the flange element 10. Furthermore, the flange element 10 which is shown in FIG. 2 is a stop 13 which advantageously serves, during a connection of the flange element 10 to the shaft segment 3, to make a defined arrangement of the flange element 10 with respect to the shaft segment 3 possible with regard to the positioning which results in the axial direction. The stop 13 advantageously serves to ensure that the flange element 10 can be introduced up to a defined depth into the cavity 7 of the tube section 4 of the shaft segment 3. In the case of a configuration of a collar 6 on the tube section 4 of the shaft segment 3, the collar 6 advantageously makes contact with the stop 13 of the flange element 10. Furthermore, the flange element 10 has a seat 14, in particular a shaft segment seat, which extends at least in sections, as viewed in the axial direction, into the cavity 7 of the tube section 4 of the shaft segment 3. Here, the outer surface of the seat 14 makes contact with the inner surface of the tube section 4. If, however, a non-positive connection is preferred between the flange element 10 and the shaft segment 3 in order to produce an assembled rotor shaft 2 according to the invention, it is conceivable that a roll-formed portion is applied on the seat 14, in particular on the outer surface of the seat 14, or is produced on the inner surface of the tube section 4 in the region of the seat 14 which is to be arranged later. As a result, a non-positive connection between the flange element 10 and the shaft segment 3 is advantageously made possible during pushing of at least the seat 14 of the flange element 10 into the tube section 4 of the shaft segment 3, on account of the present roll-formed portion.

If a positively locking connection between the flange element 10 and the shaft segment 3 is preferred, it is conceivable that an external thread (not shown here) is produced, for example, in the region of the seat 14, which external thread can be brought into engagement with an internal thread (not shown here) of the tube section 4. The internal thread of the tube section 4 advantageously extends on the inner surface of the tube section 4 at least in the region which is later in contact with the seat 14 of the flange element 10 during the assembly of an assembled rotor shaft. It is also conceivable, however, that an internal thread is produced along the entire inner surface of the tube section 4. The thread 12, in particular the internal thread of the flange element 10 which is configured at least in sections in the bore 11, advantageously serves to connect the rotor shaft 2 and, as a consequence, the rotor 1 to a component to be driven, such as a shaft. In the case of an arrangement of two pressure disks 30, 31 (as shown in FIG. 2), it is advantageously conceivable that one of the pressure disks 30 is arranged at one distal end, at which, for example, a collar 6 is configured on the tube section 4, whereas another one of the pressure disks 31 is arranged at another distal end of the tube section 4, which other distal end lies opposite that distal end, at which, for example, the collar 6 is configured. The two pressure disks 30 and 31 clamp the laminated core 20 and, in particular, the individual laminated core disks of the laminated core 20 axially between them, and advantageously serve to press the individual disks of the laminated core 20 against one another axially.

It is advantageously conceivable that roll-formed portions (not shown here) are configured in the setting regions of the first pressure disk 30 and of the second pressure disk 31 on the tube outer surface 4.1 of the tube section 4 of the shaft segment 3. Roll-formed portions of this type are advantageously also configured if a collar 6 is integrally formed on the tube section 4. It is also conceivable that a roll-formed portion is configured on the tube outer surface 4.1 of the tube section 4 of the shaft segment 3 merely in the setting region of the second pressure disk 31.

Figure 3A:
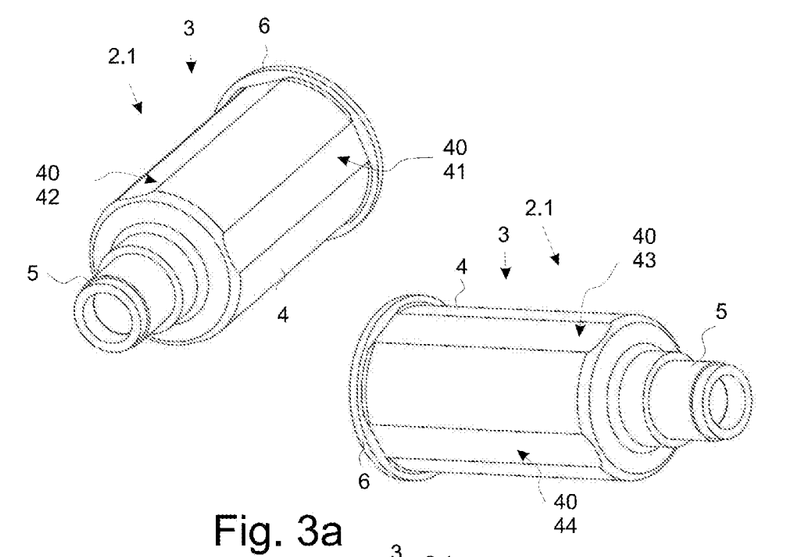
FIG. 3a is a perspective view of an example first rotor shaft component, in particular a shaft segment of an assembled rotor shaft.
Figure 3B:
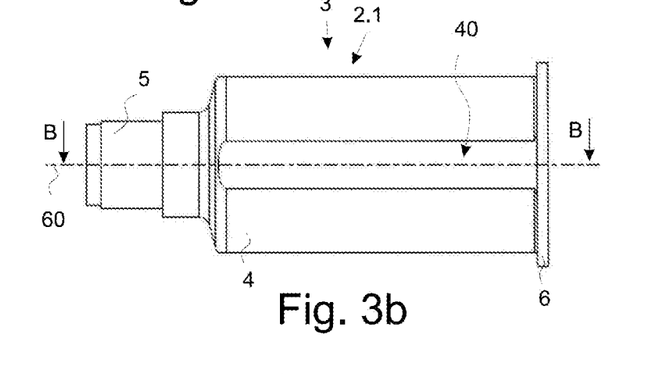
Figure 3C:
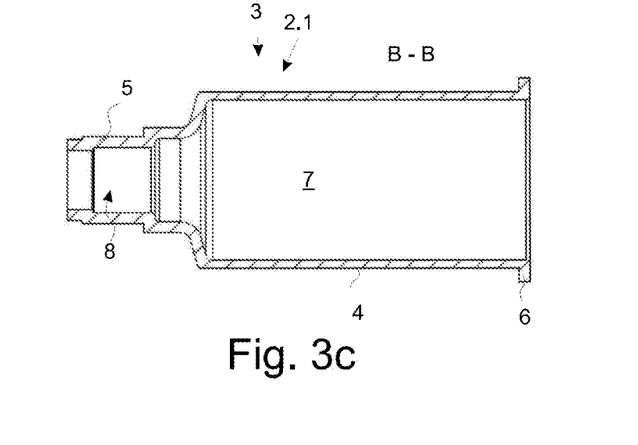
FIG. 3c is a side view of a section BB in FIG. 3b of the example shaft segment.

FIGS. 3a to 3c show various illustrations of one embodiment of a shaft segment 3 and, as a consequence, of a first rotor shaft component 2.1. The shaft segment 3 which is shown in FIGS. 3a to 3c advantageously serves to produce an assembled rotor shaft according to the invention. As has already been described, the shaft segment 3 has a tube section 4 and a flange section 5. The tube section 4 and the flange section 5 are produced in one piece in one production method. Furthermore, the shaft segment 3 has a collar 6 which extends radially to the outside at one distal end of the tube section 4, which distal end lies opposite that distal end, at which the flange section 5 is configured. The tube section 4, the flange section 5 and the collar 6 are advantageously configured during one production step, in particular one forming step, particularly advantageously during tensile compressive forming. It is also conceivable that the collar 6 is produced subsequently by means of a further forming method after the forming of a tube to form a shaft segment 3 having at least one tube section 4 and one flange section 5. As shown in FIGS. 3a to 3c, the shaft segment 3 advantageously has a profiling 40. The profiling 40 which is shown here is particularly advantageously configured in the form of a plurality of flattened material portions or else material cutouts or depressions which are configured distributed in the circumferential direction. Said flattened material portions, a first flattened material portion 41 and a second flattened material portion 42 being shown in the left-hand illustration and a third flattened material portion 43 and a fourth flattened material portion 44 being shown in the right-hand illustration, advantageously extend at least in sections in the axial direction along the rotational axis 60. The flattened material portions 41, 42, 43, 44 particularly advantageously extend along the tube outer surface 4.1 of the entire tube section 4 of the shaft segment 3. As viewed in the circumferential direction, the flattened material portions 41, 42, 43, 44 are advantageously arranged such that they are spaced apart uniformly from one another.

Figure 4A:
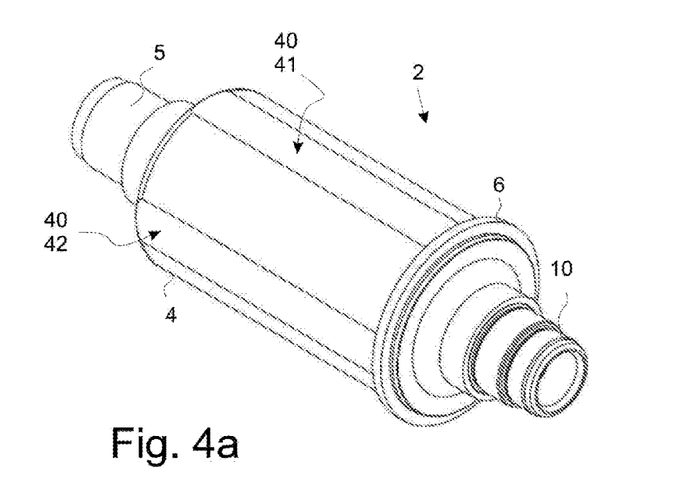
FIG. 4a is a perspective view of an example rotor shaft.
Figure 4B:
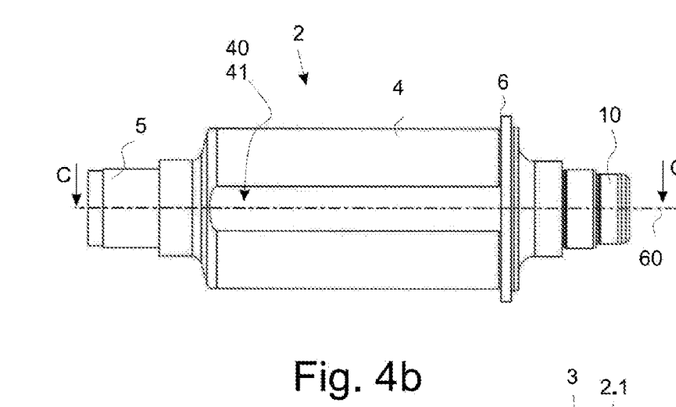
FIG. 4b is a side view of the example rotor shaft shown in FIG. 4.
Figure 4C:
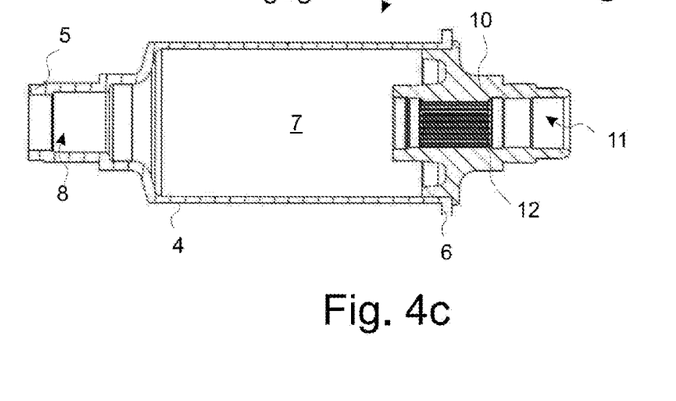
FIG. 4c is a side view of a section C-C in FIG. 4b of the example rotor shaft.
Figure 4D:
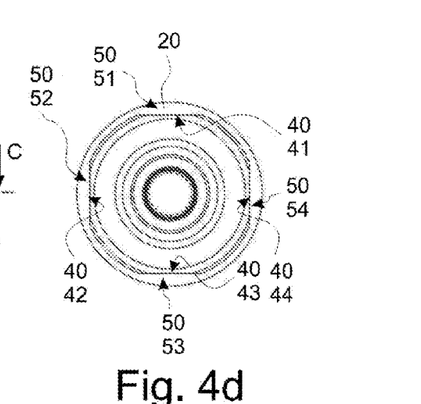
FIG. 4d is a plan view of an example rotor, having an example rotor shaft in accordance with FIGS. 4a to 4c.

FIGS. 4a to 4c show one embodiment of a rotor shaft 2 according to the invention. That embodiment of a rotor shaft 2 according to the invention which is shown in FIGS. 4a to 4c advantageously has that embodiment of a shaft segment 3 according to the invention which is shown in FIGS. 3a to 3c. In addition to the shaft segment 3 which is shown in FIGS. 3a to 3c, the rotor shaft 2 which is shown in FIGS. 4a to 4c has a flange element 10 which is advantageously connected to the shaft segment 3 in a non-positive, positively locking and/or integrally joined manner. In particular, FIG. 4d shows the rotor shaft 2 which is shown in FIGS. 4a to 4c with a laminated core 20 which is arranged on the tube section 4 of the shaft segment 3. It becomes clear in accordance with FIG. 4d how an interaction takes place between the profiling 40 of the rotor shaft 2 and the structuring 50 of the laminated core 20 or the individual laminated core disks of the laminated core 20. Here, the profiling 40 is advantageously configured in the geometric form of a flattened material portion, in particular a plurality of flattened material portions 41, 42, 43, 44. The structuring 50 of the laminated core 20 is also configured in the geometric form of a flattened material portion, in particular a plurality of flattened material portions 51, 52, 53, 54, in the regions of which the through opening or the bore 20.1 of the laminated core 20 has a smaller diameter than in the remaining regions of the bore 20.1. On account of the introduction or the arrangement of the flattened material portions 51-54 of the structuring 50 in or on the flattened material portions 41 to 44 of the profiling 40, a positively locking connection is produced between the laminated core 20 and the rotor shaft 2, in particular the tube section 4 of the shaft segment 3, with the result that a reliable torque transmission between the laminated core 20 and the rotor shaft 2 is made possible.

Figure 5A:
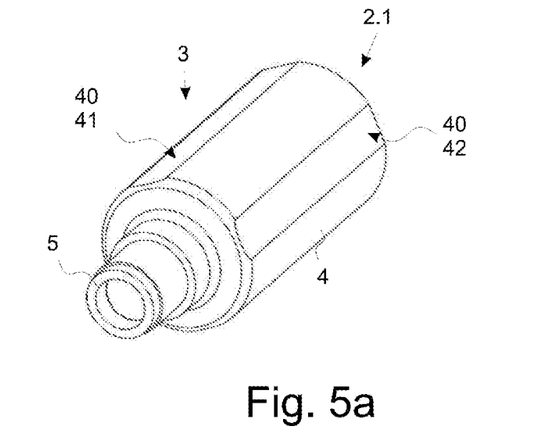
FIG. 5a is a perspective view of still another example shaft segment of an assembled rotor shaft.
Figure 5B:
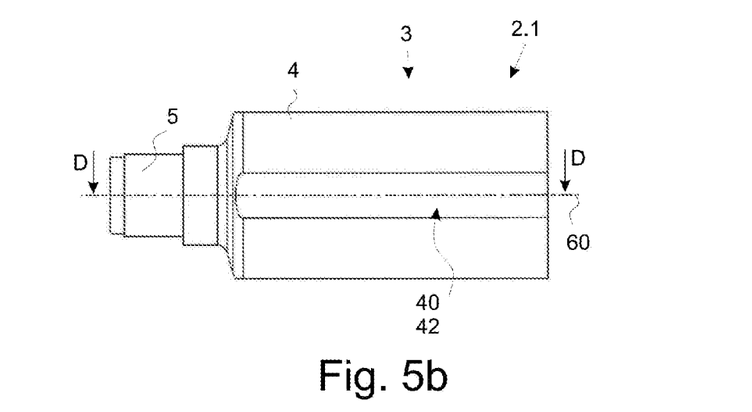
FIG. 5b is a side view of the example shaft segment shown in FIG. 5.
Figure 5C:
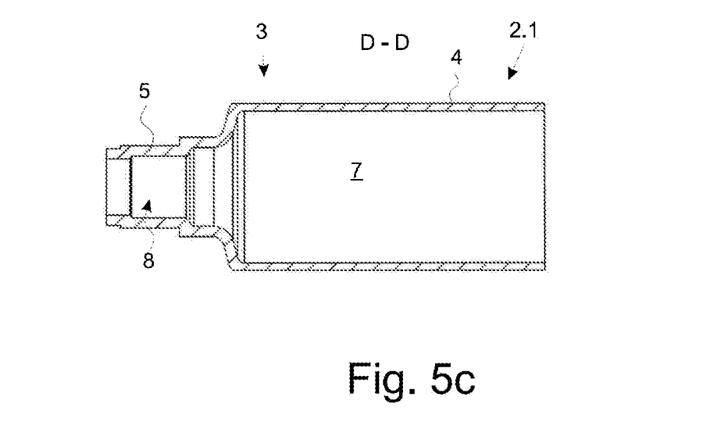
FIG. 5c is a side view of a section D-D in FIG. 5b of the example shaft segment.

FIGS. 5a to 5c show a further embodiment of a shaft segment 3 of a rotor shaft 2 according to the invention. In a difference from that embodiment of a shaft segment 3 which is shown in FIGS. 3a to 3c, that embodiment of a shaft segment 3 which is shown in FIGS. 5a to 5c does not have a collar 6. It is conceivable that, for the arrangement of the laminated core 20, as shown in FIGS. 1a to 1d, for example, the roll-formed portions are configured in the respective setting regions of two pressure disks 30, 31, as shown in FIG. 2, for example. Axial pressing of the laminated core disks of the laminated core 20 is advantageously made possible by way of the arrangement of two pressure disks. At the same time, the pressure disks and the collar 6 which is shown, for example, in FIGS. 3a to 3c prevent an undesired axial displacement of the laminated core 20 along the tube section 4 of the shaft segment 3.

LIST OF DESIGNATIONS

1 Rotor
2 Rotor shaft
2.1 First rotor shaft component
2.2 Second rotor shaft component
3 Shaft segment
4 Tube section
4.1 Tube outer surface
4.2 Shoulder
5 Flange section
6 Collar
7 Cavity
8 Bore
9 Closure
10 Flange element
10.1 Joining section
11 Bore
12 Thread
13 Stop
14 Seat
20 Laminated core
20.1 Bore/passage opening
30 (First) pressure disk
31 (Second) pressure disk
30.1 Through bore
40 Profiling
41 (First) flattened material portion
42 (Second) flattened material portion
43 (Third) flattened material portion
44 (Fourth) flattened material portion
50 Structuring
51 (First) flattened material portion
52 (Second) flattened material portion
53 (Third) flattened material portion
54 (Fourth) flattened material portion
60 Rotational axis
A-A Section A-A
B-B Section B-B
C-C Section C-C
D-D Section D-D
E Viewing direction

What is claimed is:
1. An asymmetric assembled rotor shaft comprising:
a first rotor shaft component configured as a shaft segment, the shaft segment having a tube section and a flange section, wherein the tube section has a tube outer surface with a profiling; and
a second rotor shaft component configured as a flange element, wherein the profiling comprises material cutouts or flattened material portions that are distributed in a circumferential direction,
wherein each of the material cutouts or flattened material portions extend so as to be uniformly spaced apart from one another at least in sections in an axial direction of the first rotor shaft component.

2. The asymmetric assembled rotor shaft of claim 1 comprising exclusively the first and second rotor shaft components.

3. The asymmetric assembled rotor shaft of claim 1 wherein the profiling is a material cutout or flattened material portion that extends at least in sections in a longitudinal direction of the first rotor shaft component.

4. The asymmetric assembled rotor shaft of claim 1 wherein the profiling comprises the material cutouts, wherein at least one of the material cutouts is configured as a depression.

5. The asymmetric assembled rotor shaft of claim 1 wherein the profiling comprises the material cutouts, wherein all of the material cutouts are configured as grooves.

6. The asymmetric assembled rotor shaft of claim 1 wherein at least one of the flange section or the flange element is permeable.

7. The asymmetric assembled rotor shaft of claim 1 wherein at least one of the flange section or the flange element is impermeable.

8. The asymmetric assembled rotor shaft of claim 1 wherein the first rotor shaft component includes a collar that extends to an outside in a circumferential direction at a distal end of the tube section, wherein the distal end is opposite an end on which the flange section is configured.

9. A rotor of an electric machine, the rotor comprising:
an asymmetric assembled rotor shaft that includes
a first rotor shaft component configured as a shaft segment, the shaft segment having a tube section and a flange section, wherein the tube section has a tube outer surface with a profiling, and
a second rotor shaft component configured as a flange element;
a laminated core disposed on the tube section; and
a pressure disk that is disposed on the tube section.

10. The rotor of claim 9 wherein the laminated core includes laminated core disks, each of the laminated core disks having a structuring that corresponds to the profiling of the rotor shaft, wherein the profiling and the structuring of the laminated core disks form a positively locking connection.

11. The rotor of claim 10 comprising a roll-formed portion configured on the tube outer surface at least in a setting region of the pressure disk such that a non-positive connection exists between the pressure disk and the tube section.

12. A method for producing the rotor of claim 9, wherein the pressure disk is a first pressure disk, the method comprising:
providing the asymmetric assembled rotor shaft;
pushing the laminated core onto the tube section such that structuring of laminated core disks of the laminated core correspond to the profiling of the tube section and interact in a positively locking manner with the profiling, wherein the laminated core is pushed on as far as a collar that is configured on the tube section or as far as the first pressure disk disposed on the tube section; and
pushing a second pressure disk that braces the laminated core axially onto the tube section as far as a roll-formed portion that is configured on the tube outer surface in a setting region of the second pressure disk such that the laminated core disks are pressed together axially.

13. The method of claim 12 comprising, prior to providing the asymmetric assembled rotor shaft, pushing the first pressure disk onto the tube section at least as far as a first roll-formed portion that is configured on the tube outer surface or as far as the collar that is configured on the tube section.

14. The method of claim 12 comprising producing the asymmetric assembled rotor shaft by
forming a tube by exerting both tensile and compressive forces on the tube to produce the first rotor shaft component with the tube section, the flange section, and the profiling;
providing the flange element as the second rotor shaft component; and
connecting the first rotor shaft component to the second rotor shaft component.

15. The method of claim 12 comprising forming a tube by exerting both tensile and compressive forces on the tube to produce the first rotor shaft component with the tube section, the flange section, and the profiling.

16. The method of claim 12 wherein the first and second rotor shaft components are connected by way of a positive locking connection.

17. The method of claim 12 wherein the first and second rotor shaft components are connected by way of a non-positive locking connection.

18. The method of claim 12 wherein the first and second rotor shaft components are connected by way of an integral connection.

* * * * *